Dec. 24, 1940.  G. J. MEAD ET AL  2,225,876
FLOATING BEARING
Filed March 21, 1939   3 Sheets-Sheet 1

INVENTOR
George J. Mead.
Andrew V.D. Willgoos.
BY Harris G. Luther
ATTORNEY

Dec. 24, 1940.   G. J. MEAD ET AL   2,225,876
FLOATING BEARING
Filed March 21, 1939   3 Sheets-Sheet 2
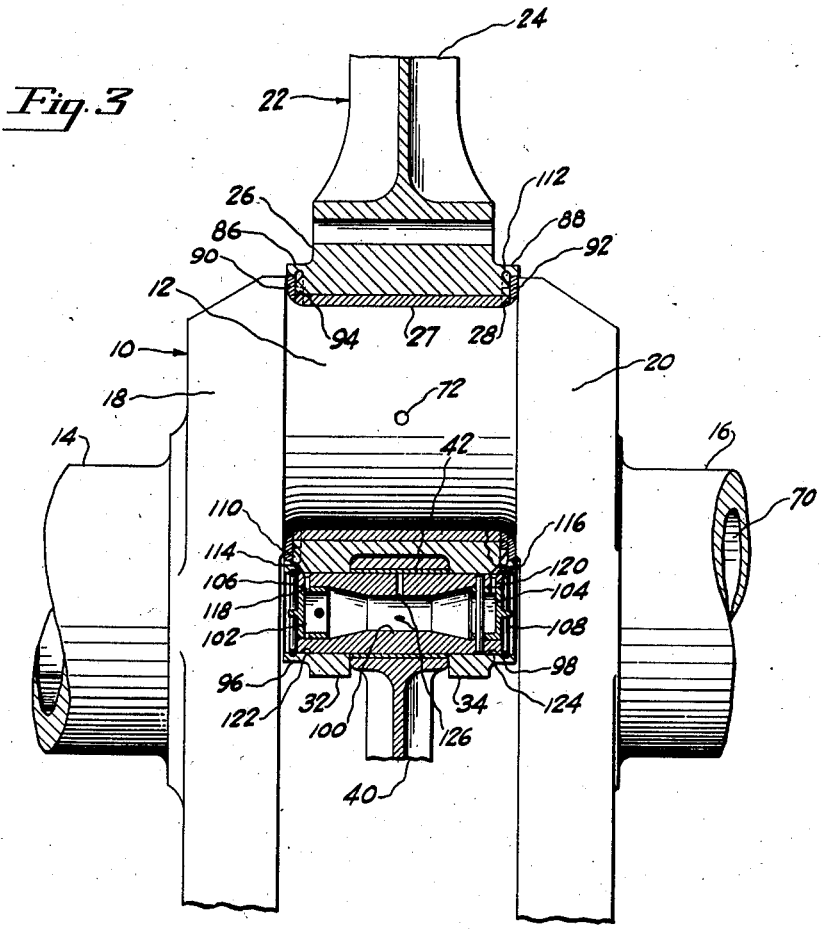
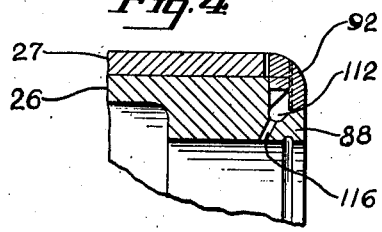
INVENTOR
George J. Mead.
Andrew V. D. Willgoos.
BY
Harris G. Luther
ATTORNEY Dec. 24, 1940.   G. J. MEAD ET AL   2,225,876
FLOATING BEARING
Filed March 21, 1939   3 Sheets-Sheet 3
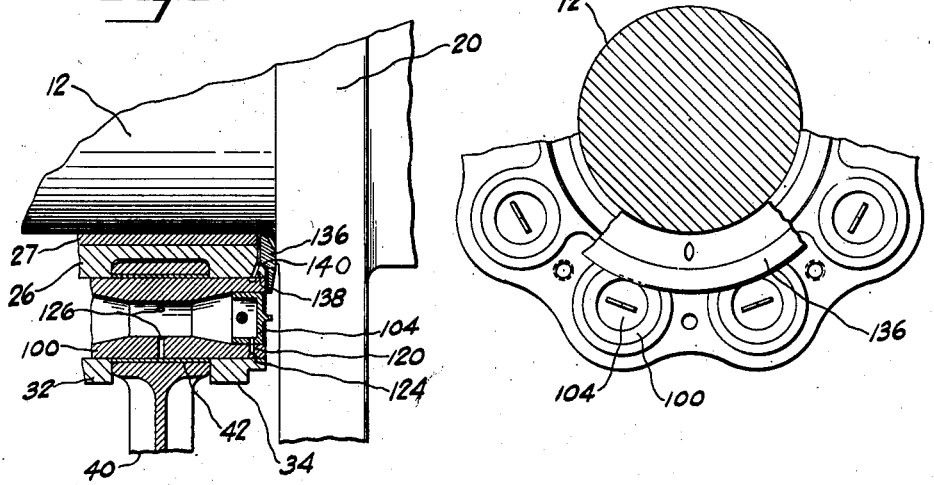
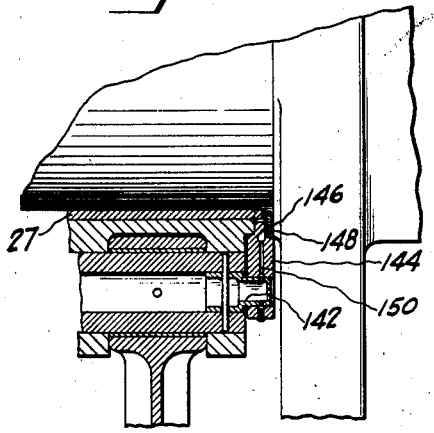
INVENTOR
George J. Mead.
Andrew V.D. Willgoos.
BY
Harris G. Luther
ATTORNEY Patented Dec. 24, 1940

2,225,876

UNITED STATES PATENT OFFICE 2,225,876

FLOATING BEARING

George J. Mead, Bloomfield, and Andrew V. D. Willgoos, West Hartford, Conn., assignors to United Aircraft Corporation, East Hartford, Conn., a corporation of Delaware Application March 21, 1939, Serial No. 263,174

20 Claims. (Cl. 74—580)

This invention relates to improvements in internal combustion engine construction and has particular reference to an improved bearing construction for connecting the master rod to the engine crankshaft and the link rods to the master rod of a radial type internal combustion engine such as is conventionally employed for the propulsion of aircraft.

An object of the invention resides in the provision of an improved construction in which the knuckle pins are rotatable relative to both of the elements which they respectively connect to thereby reduce the wear on any particular portion of the pin.

A further object resides in an improved knuckle pin and pin holding construction which results in improved lubrication both of the knuckle pins and of the engine crankpin bearing.

A still further object resides in the provision of an improved engine knuckle pin construction arranged for economical production and facility of assembly with the cooperating elements of the engine.

An additional object resides in the provisions of an improved engine bearing construction in which the crank bearing sleeve is arranged to move to a limited extent, or float, with respect to both the crankpin and the connecting rod.

Other objects and advantages will be more particularly pointed out hereinafter or will become apparent as the description proceeds.

In the accompanying drawings, in which like reference numerals are used to designate similar parts throughout, there is illustrated, by way of example, several mechanical arrangements constructed according to the invention. The drawings, however, are for the purpose of illustration only and are not to be taken as limiting or restricting the scope of the invention as set forth in the appended claims.

In the drawings,

Fig. 3 is a view similar to Fig. 1 showing a modified form of master rod and link rod construction.

Fig. 4 is a view on an enlarged scale of a fragmentary portion of the main rod, bearing sleeve and oil seal ring shown in Fig. 3.

Fig. 5 is a fragmentary view similar to a portion of Fig. 1 showing a slightly different form of bearing construction.

Fig. 6 is a sectional view on the line 6—6 of Fig. 5 looking in the direction of the arrows, and Fig. 7 is a view similar to Fig. 5 showing still another modification of the improved bearing construction.

Figure 1:
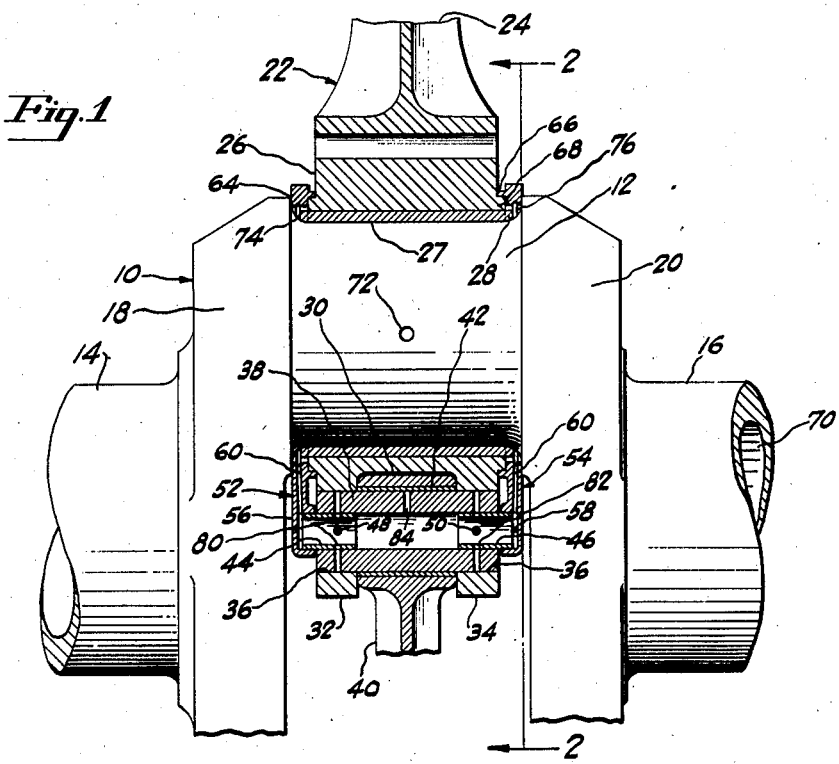
Fig. 1 is an elevational view of a fragmentary portion of an engine crankshaft and master rod and link rod construction assembled therewith, the master rod and link rod assembly being shown in vertical section to better illustrate the construction thereof.

It has recently been found that a large number of failures of machine parts, especially heavily loaded relatively movable parts such as the journals and journal housings of engine bearings, have been due to a phenomenon known as galling. When unlubricated or poorly lubricated surfaces are in contact and subjected to relative movements of extremely minute magnitude both surfaces are marred and subjected to friction induced strains and heat which affect the metal for a considerable distance inward from the surfaces. Where the surfaces are provided on heavily loaded machine elements this deterioration of a portion of the metal may quickly lead to a structural failure. Galling may usually be avoided by providing relative movements of greater magnitude between the contacting surfaces so that the same increment of area of one surface is not always in contact with a similar increment of area of the other surface. This greater relative movement provides some lapping action that tends to keep both surfaces smooth and also tends to spread a film of lubricant between the surfaces. Thus, if an element, such as a crank bearing sleeve, rotatably receives one element, such as the crankpin, it has been found that it should not have a solid fit in the supporting element, such as the connecting rod or master rod, since movements of microscopic magnitude will, in such a case, induce galling of the contacting surfaces of the sleeve and rod, but the sleeve should have a certain freedom of movement relative to the rod. In some cases it has been found desirable to provide a free bearing fit between the sleeve and the supporting rod and apply a coating of soft bearing metal to one of the surfaces.

In the case of the knuckle pins used to connect the link rods to the master rod in radial engines it has been found sufficient to provide bearings for free rotation of the pin both in the pin receiving end of the link rod and in the pin receiving portion of the master rod although it is desirable to also provide for a limited endwise movement of the pin in its bearings. This is the case because there is a relatively small amount of movement between the link rod and the master rod and the rotational movement of the pin in its bearings is only a fraction of a revolution for each revolution of the engine. Some movement relative to both the link rod and the master rod, however, prevents galling and maintains a film of lubricant over the entire surface of the pin.

Conditions are somewhat different in the case of the crankpin bearing since the relative movement is great and the loading extremely high. It has been found desirable to restrain the bearing sleeve against rotation relative to one of the two members between which it is interposed, preferably the connecting rod or master rod, and depend upon endwise movement of the sleeve to prevent galling of the contacting rod and sleeve surfaces. By thus retaining all of the rotary movement between the sleeve and the other element, such as the crankpin, lubricant is continuously wiped at high speeds between the surfaces of these elements to produce a continuous film of sufficient durability to resist the heavy loads to which the bearing is subjected.

The improved bearing construction, hereinafter described, and illustrated in several slightly different forms in the accompanying drawings, is arranged to prevent galling both of the crank bearing elements and the knuckle pins and to provide an adequate supply of lubricant to all bearing surfaces.

Figure 2:
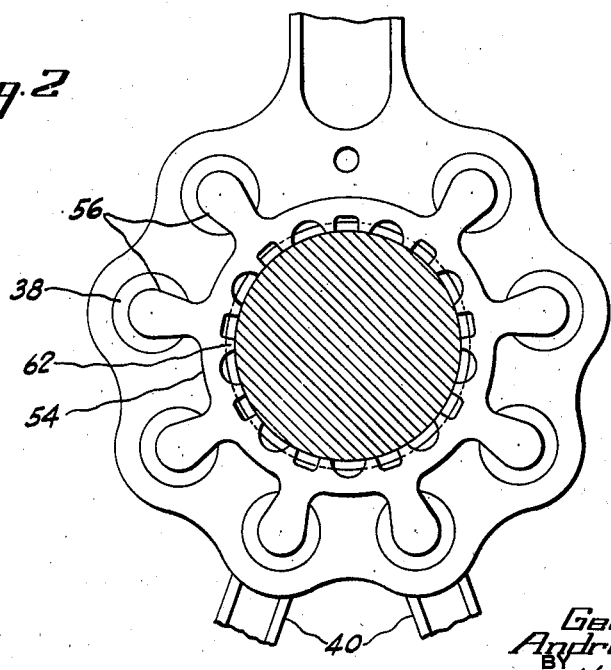
Fig. 2 is a sectional view of the crankshaft and an elevational view of the master rod and link rod assembly taken on the line 2—2 of Fig. 1 looking in the direction of the arrows.

Referring to the drawings in detail, and particularly to Figs. 1 and 2, the numeral 10 generally indicates an engine crankshaft having a crankpin 12 and main bearings 14 and 16 disposed one at each end of the crankpin and connected thereto by respective crank cheeks 18 and 20. The numeral 22 generally indicates a master rod having a shaft portion 24 adapted to be connected with an engine piston (not illustrated) and a big end portion 26 apertured to constitute a journal housing to receive a journal in the form of the crankpin 12. Either the crankshaft 10 or the big end of the connecting rod 22 is split to permit assembly of the rod on the crankpin, the improved bearing construction of this invention being equally adaptable to either arrangement.

A bearing sleeve 27 is disposed between the crankpin and the surface of the aperture in the main rod and is provided at its end with indentations providing extensions or crenelations, as indicated at 28, for a purpose to be presently described. The big end 26 is annularly grooved, as indicated at 30, and the annular rings or lands 32 and 34 are provided at spaced intervals with registering apertures, as indicated at 36, for the reception of the ends of the knuckle pins 38 which pivotally connect the link rods 40 with the big end of the main rod 22.

As the improved knuckle pin construction is the same for all of the link rods 40 it is believed that a detailed description of only one pin is sufficient for the purpose of this disclosure. The knuckle pin itself is in the form of a hollow cylinder of hardened material, as is clearly shown in Fig. 1, and, in its assembled position, has its end portions disposed in the apertures 36 in the spaced lands 32 and 34 and its mid-portion surrounded by the apertured end of the respective link rod 40. Preferably a bushing 42, of some suitable bearing material such as bronze, is interposed between the mid-portion of the pin and the surface of the pin receiving aperture in the link rod. The apertured end of the link rod 40 is of such a width as to just fill the space between the lands 32 and 34 and the pin 38 is of a length slightly less than the distance between the outer surfaces of these lands so that the pin may have a slight endwise movement without projecting beyond the lands.

Bushings, as indicated at 44 and 46, are disposed one in each end of the bore of the pin 38 and are held in position by suitable means such as the through pins 48 and 50 to project somewhat beyond the respective ends of the pins. Suitable integral extensions may be provided on the knuckle pins in lieu of these bushings if desired.

A pair of end plates, as generally indicated at 52 and 54, surround the crankpin 12 one at each side of the main rod big end 26 and are each provided with extensions as indicated at 56 which overlie the respective ends of the knuckle pins 38. Each extension is provided with a circular depression, as indicated at 58, which receives and fits closely about the projecting ends of the corresponding bushing 44 or 46 but has its end wall slightly spaced from the end of the bushing. Each of these depressions 58 are connected with the crankpin receiving aperture in the plate by an oil channel, as indicated at 60. The edge of the crankpin receiving apertures in the plates 52 and 54 are provided with extensions or key portions as indicated at 62 in Fig. 2 which fit freely between the crenelations 28 on the bearing sleeve 27 to restrain the bearing sleeve against rotation relative to the big end of the main rod 22. The length of the bushing is slightly less than the distance between the inner surfaces of the plates to provide a limited freedom of endwise movement for the bushing. Each of the rings 52 and 54 has an annular portion which bears against an annular lateral bearing portion on the crank cheek immediately at each end of the crankpin 12, as indicated at 64 on Fig. 1, and also has an inwardly projecting annular flange 66 which overlies an outwardly extending annular flange 68 on the portion of the big end 26 immediately surrounding the crankpin receiving aperture. The crankshaft is hollow, as indicated at 70, and is filled with lubricating oil under pressure developed by an engine lubricating oil pump (not illustrated) in a manner well known to the art. The crankpin 12 is provided with one or more centrally located oil apertures, as indicated at 72, through which lubricating oil flows from the interior of the crankpin to the inner surface of the bearing sleeve 27. The oil flowing from the aperture 72 flows in both directions to the space between the adjacent surfaces of the crankpin and bearing sleeve toward the edges of the bearing sleeve where it passes into annular oil grooves 74 and 76 which connect with the channels 60 in the respective plates 52 and 54 leading to the recesses 58. Some oil also passes between the outer surface of the bushing and the surface of the bushing receiving aperture in the master rod. From the recesses 58 the oil flows into the interiors of the knuckle pins 38 through the hollow bushings 44 and 46 filling the interior of each knuckle pin with lubricating oil under pressure. The oil pressure in the knuckle pin bores acts against the end walls of the bushing receiving depression 58 to force the end plates 52 and 54 apart. The force created by the oil pressure in the knuckle pins tending to force the end plates apart causes the end plates to bear against the annular portions of the crank cheeks at the ends of the crankpin over the contact areas 64 to provide an oil seal between the outer side of each end plate and the crankshaft at the corresponding end of the crankpin. At the same time the overlapping flanges 66 and 68 provide an oil seal between the end plates and the connecting rod big end so that substantially all of the oil supplied to the crank bearing must leave the crank bearing through the oil channels 60 and flow into the hollow knuckle pins. The knuckle pins are provided with radial oil channels as indicated at 80 and 82 in the end portions thereof for supplying lubricating oil to the bearings between the ends of the knuckle pins and the rings 32 and 34, and with one or more centrally disposed radial oil channels 84 for supplying lubricant to the bearing between the intermediate portion of the knuckle pin and the apertured end of the link rod 40. As the fit between the knuckle pins and the big end rings and between the knuckle pins and the link rods can be made quite close a relatively high oil pressure can be maintained between the crankpin and the bearing sleeve 27 to provide adequate lubrication for the crankpin bearing. As each knuckle pin is freely rotatable both in the big end rings and in the connected end of the link rod, the relative movement between the link rods and the main rods about the axis of the knuckle pin is divided between these bearings, the link rod turning to some extent on the knuckle pin and the knuckle pin turning to some extent in the big end rings. The knuckle pin may also have a slight endwise movement in both rods. By thus making the knuckle pin free in both rods, galling in either rod is avoided and since the high pressure lubrication described above is provided for the entire bearing surface of each pin and on both sides of the crank bearing sleeve friction in both the crankpin and knuckle pin bearings is reduced to such an extent as to greatly prolong the life of the engine hearing structure.

In the modified construction illustrated in Figs. 3 and 4 the crankshaft main rod and link rod construction is substantially the same as that described above in connection with Figs. 1 and 2 and the bearing sleeve 27 may be the same as that already described. The connecting rod big end differs from that above described in certain minor details, particularly in that the big end is provided on each side with an outwardly projecting flange, as indicated at 86 and 88, surrounding the crankpin aperture and overlying at their outer portions respective packing rings 90 and 92 which are disposed in spaces provided within the flanges 86 and 88 and between the sides of the main rod immediately adjacent to the crankpin aperture and the adjacent surfaces of the crank cheeks 18 and 20. These packing rings are provided with key portions, as indicated at 94 which extend through registering depressions in the end of the bearing sleeve 27 and in the surface of the bearing receiving aperture in the big end 26 to retain the bearing sleeve against rotation in the main rod big end while permitting limited endwise movements of the sleeve. The rings 32 and 34 provided on the main rod big end are also provided with annular flanges, as indicated at 96 and 98, surrounding and projecting outwardly from each knuckle pin aperture in the rings. The knuckle pins, one of which is indicated at 100, pass through bushing lined apertures in the connected ends of the respective link rods 40 and bear at their ends in apertures provided in the rings 32 and 34 integral with the connecting rod big end in the manner indicated above. The ends of the knckle pins are closed by cap plugs as indicated at 102 and 104 and the pins are retained in the main rod big end by snap rings 106 and 108 seated in annular grooves provided in the interior surfaces of the respective annular flanged portions 96 and 98. The lubricating oil flowing into the crankpin bearing through the oil lead apertures, as indicated at 72, flows to the ends of the bearing sleeve 27 whence it flows through the spaces between the detents 28 of the bearing sleeve and the sides of the depressions 94 in the big end aperture into annular oil channels, as indicated at 110 and 112, provided in the inner surfaces of the annular flange portions 86 and 88, which annular oil channels are connected with the interiors of the various knuckle pins by channels 114 and 116 in the main rod big end and channels 118 and 120 in the end portion of the knuckle pins. Annular grooves 122 and 124 are provided in the exterior surfaces of the end portions of the knuckle pins to carry the lubricating oil around the bearings between the knuckle pin end portions and the pin receiving apertures in the rings 32 and 34, and radial channels 126 are provided in the mid-portions of the knuckle pins to carry lubricating oil from the interiors of the knuckle pins to the bearings between the knuckle pins and the respective link rods 40. As is particularly illustrated in Figs. 3 and 4 the inner sides of the packing rings 90 and 92 overlie open sides of the annular oil channels 110 and 112 so that pressure of the lubricating oil in these channels forces the packing rings outwardly to provide an oil seal between the main rod and the crankshaft and maintain the pressure of the oil flowing into the hollow interiors of the knuckle pins. As the knuckle pin bearings are closely fitted the oil bleeds from these bearings into the engine crankcase at a relatively slow rate so that the oil pressure is maintained throughout the crankpin and knuckle pin bearing system and the loss in this system is only sufficient to provide an adequate flow of lubricating oil through the bearings. In this case as in that described above the knuckle pin is rotatable both in the link rod bearing and in the main rod bearings and also has a limited freedom of endwise movement in these bearings. By this arrangement galling is prevented and a material reduction in the friction and wear on the knuckle pin and crank bearing sleeve is obtained.

In Figs. 5 and 6 there is illustrated another mechanical variation of the improved bearing construction. In this arrangement the crank bearing sleeve 27 is the same as that shown in Figs. 1 and 3 and described above, and the knuckle pins may be similar to the pin 100 of Fig. 3 having its ends closed by end caps, as indicated at 104. The knuckle pins 100 are received at their ends in apertures provided in the lands 32 and 34 each end portion having in its outer surface an annular groove 124 for carrying oil around the bearings between the knuckle pins and the master rod. An oil passage 138 leads through the adjacent inner portion of the master rod to each respective groove 124. An end ring 136 is disposed between each side of the master rod and the adjacent crank cheek and has a bearing contact with the portion of the crank cheek immediately surrounding the end of the crank pin, and an outer flange portion overlying the radially inner portions of the adjacent ends of the knuckle pins to retain the knuckle pins in assembled relation.

In this construction the lubricating oil flows from the center of the crank bearing to the ends where it is diverted by the end rings 136 through the passages 138 to the knuckle pins. The oil pressure between the end rings and the adjacent portions of the master rod big end forces the end rings against the adjacent crank cheeks to provide an oil seal at each end of the crank pin bearing. A seal is provided between the respective end rings and the master rod by the overlapping annular shoulders 140 and the oil is led into the interiors of the knckle pins and from there to the bearings in the link rods in the manner described above in connection with Figs. 3 and 4. The end rings 136 are constructed to permit free rotation and a limited freedom of endwise movement of both the crank bearing sleeve and the knuckle pins.

In the arrangement shown in Fig. 7 the knuckle pins are similar to the knuckle pins 38 of Fig. 1 except that the end bushings 142 are somewhat longer than the bushings 46 and are provided with closed outer ends. The end plates or spiders 144 of Fig. 7 are also generally similar to the plates 52 and 54 of Fig. 1 except that the plates 144 are provided with apertures receiving the bushings 142 instead of the blind recesses 58 of the spiders 52 and 54, and have concentric annular grooves, as indicated at 146 in which are disposed respective freely rotatable packing rings 148 preferably formed of a bearing material such as bronze. The end plates are keyed to the respective ends of the bearing sleeve and are provided with oil channels 150 for conducting lubricating oil from the crank bearing to the interiors of the knuckle pins and the knuckle pin bearings. Oil pressure between the end plates 144 and the respective packing rings 148 forces the packing rings into sealing engagement with the respective crank cheeks and the edges of the grooves 146 provide a seal between the packing rings and the end plates. Suitable recesses may be provided in the inner side of each packing ring to provide a free flow of oil between the rings and the adjacent surfaces of the master rod.

While several slightly different mechanical arrangements have been illustrated in the accompanying drawings and hereinabove described for the purpose of disclosing the invention, it is to be understood that the invention is not limited to the particular arrangement so illustrated and described but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In a bearing construction, a bearing element interposed between two relatively rotatable members and rotatable relative to at least one of said members and projecting at at least one end beyond one of said members, and means retaining said bearing element in operative position between said members while providing a limited freedom of endwise movement for said element comprising an annular member surrounding the projecting end of said bearing element, and slidable connections between said relatively rotatable members and said annular member.

2. In a bearing for rotatably supporting a journal in a housing, a bearing sleeve interposed between said journal and said housing and projecting at at least one end beyond said housing, and means connected by a slidable connection with the portion of said bearing sleeve projecting beyond said housing and secured to said housing for restraining said sleeve against rotation relative to said housing while providing a limited freedom of endwise movement of said sleeve in said housing.

3. In a crank bearing, a crank pin having a crank cheek at at least one end thereof, a connecting rod, a bearing sleeve between said crankpin and said connecting rod, and a plate secured against rotation relative to said rod by contacting members associated with said rod and held in position on said rod by said crank cheek and means on said plate inter-engaging the ends of said bearing sleeve to restrain said sleeve against rotation relative to said connecting rod while permitting a limited freedom of endwise movement of said sleeve in said rod.

4. In combination with a crank bearing comprising a pair of spaced crank cheeks, a crankpin connecting said crank cheeks, a connecting rod receiving said crankpin for rotation therein, and a bearing sleeve interposed between said crankpin and said connecting rod, means at each end of said crankpin interlocking said connecting rod and said bearing sleeve against relative rotation while providing a limited freedom of endwise movement of said sleeve in said rod, said means being movable by lubricating oil pressure to provide oil seals between said connecting rod and said crank cheeks.

5. In an engine having a master rod and one or more link rods, means for pivotally connecting each link rod with said master rod comprising a knuckle pin rotatable relative to both rods and having a pressure lubricated bearing in each rod, a loose plate associated with the master rod and one end of said knuckle pin and a substantially oil tight connection between said plate and said pin directing oil under pressure to said pin and providing for rotation and limited freedom of endwise movement of said pin relative to said plate and said master rod.

6. In an engine having a master rod having a main bearing and one or more link rods, means for pivotally connecting each link rod with said master rod comprising a hollow knuckle pin rotatable in bearings in both rods and having its interior connected by oil passages with said bearings, means for supplying lubricant under pressure to the interior of said pin, a plate encircling said main bearing and restrained against rotation relative thereto for closing one end of said hollow knuckle pins, and retaining said pins in said master rod, and a substantially oil tight connection between said plate and said pin providing for rotation and limited freedom of endwise movement of said pin relative to said plate.

7. In an engine having a master rod and one or more link rods, means for pivotally connecting each link rod with said master rod comprising a hollow knuckle pin rotatable in bearings in both rods, and means for closing the ends of said hollow knuckle pin and retaining said pin against excessive axial movement through said bearings comprising a pair of loose plates arranged one at each side of said master rod, means including said pins restraining said plates against rotation relative to said master rod, said plates being restrained against axial movement relative to said master rod only by contact with means carried by the crankpin on which the master rod is mounted.

8. In combination, a crankshaft, a master rod having a crankpin bearing connection with said crankshaft, a plurality of link rods, a hollow knuckle pin pivotally connecting each link rod with said master rod rotatable with respect to both the master rod and the respective link rods, means actuated by lubricating oil pressure to seal said crankpin bearing against oil leakage, and means for conducting oil from said crankpin bearing through said hollow knuckle pins to the bearings between said knuckle pins and the master rod and respective link rods.

9. In combination, a crankshaft, a master rod having a crankpin bearing connection with said crankshaft, a bearing sleeve between said master rod and the crankpin, a plurality of link rods, a hollow knuckle pin connecting each link rod with said master rod rotatable with respect to both the master rod and the respective link rods, means for locking said bearing sleeve to said master rod against relative rotation while providing a limited freedom of endwise movement of said sleeve in said rod, said means being also actuated by lubricating oil pressure to seal said crankpin bearing against oil leakage, and means for conducting oil from said crankpin bearing through said hollow knuckle pins to the bearings between said knuckle pins and the master rod and respective link rods.

10. In combination, a crankshaft, a master rod having a crankpin bearing connection with said crankshaft, a bearing sleeve between said master rod and the crankpin, a plurality of link rods, a hollow knuckle pin connecting each link rod with said master rod rotatable with respect to both the master rod and the respective link rods, means locking said bearing sleeve to said master rod against relative rotation and actuated by lubricating oil pressure to seal said bearing against oil leakage said means being also effective to seal the ends of said hollow knuckle pins against oil leakage, and means for conducting oil from said crankpin bearing through said hollow knuckle pins to the bearings between said knuckle pins and the master rod and respective link rods.

11. In combination, a crankshaft, a master rod having a crankpin bearing connection with said crankshaft, a plurality of link rods, a hollow knuckle pin connecting each link rod with said master rod rotatable with respect to both the master rod and the respective link rods, means locking said bearing sleeve to said master rod against relative rotation and constituting under lubricating oil pressure a seal to seal said bearing against oil leakage said means also sealing the ends of said hollow knuckle pins against oil leakage and providing oil passages from said crankpin bearings to the interiors of said hollow knuckle pins, said knuckle pins having apertures therethrough for conducting oil to the bearings between said knuckle pins and the master rod and respective link rods.

12. In combination, a crankshaft, a master rod having a crankpin bearing connection with said crankshaft, a plurality of link rods, a hollow knuckle pin connecting each link rod with said master rod rotatable with respect to both the master rod and the respective link rods, means for locking said bearing sleeve against rotation relative to said master rod and for retaining said knuckle pins against excessive endwise movements said means sealing the ends of said hollow knuckle pins and operative when subjected to pressure of lubricating oil in said hollow knuckle pins to contact said crankshaft at the ends of said crankpins to seal said crankpin bearing against oil leakage and provide oil passages from said crankpin bearing to the interiors of said hollow knuckle pins, said hollow knuckle pins having apertures for conducting oil to the bearings between said pins and said master rods and the respective link rods.

13. The arrangement as set forth in claim 12 in which said bearing sleeve locking, oil sealing, and oil conducting means comprising a pair of end plates located one at each end of said crankpin and having extensions overlying the end of said knuckle pin.

14. The arrangement as set forth in claim 12 in which said bearing sleeve locking, oil sealing, and oil conducting means comprising a pair of end plates located one at each end of the crankpin and having extensions overlying the end of said knuckle pin and in which an oil seal is provided between each end plate and the adjacent portion of the crankpin receiving end of said master rod.

15. The arrangement as set forth in claim 12 in which said bearing sleeve locking, oil sealing, and oil conducting means comprises a pair of end plates located one at each end of the crankpin having extensions overlying the ends of said hollow knuckle pins and in which a bushing is inserted in each end of each knuckle pin and extends into an annular depression provided in the corresponding extension of the respective end plate.

16. Means for locking the bearing sleeve of a crankshaft bearing against rotation relative to a connecting rod and for sealing said bearing against oil leakage and retaining associated knuckle pins against endwise movement comprising a pair of end plates surrounding the crankpin of the crankshaft at each end of the connecting rod and having extensions overlying the ends of the knuckle pins.

17. In combination with an engine crankshaft, master rod and link rods, knuckle pins for connecting said link rods to said master rod each having a bearing in the respective link rod and a bearing in said master rod and being longitudinally and rotationally movable in said bearings, and a pair of opposed ring members carried by said crankshaft and overlapping the ends of said knuckle pins to restrain said knuckle pins against excessive longitudinal movement.

18. In combination with an engine crankshaft, master rod and link rods, knuckle pins for connecting said link rods to said master rod each having a bearing in the respective link rod and a bearing in said master rod and being longitudinally and rotationally movable in said bearings, and a pair of opposed ring members carried by said crankshaft at each side of said master rod to constitute an oil seal between said master rod and said crankshaft, said rings overlapping the respective ends of said knuckle pins to restrain said pins against excessive longitudinal movement.

19. In combination with an engine crankshaft, master rod and link rods, knuckle pins for connecting said link rods to said master rod each having a bearing in the respective link rod and a bearing in said master rod and being longitudinally and rotationally movable in said bearings, a pair of rings carried by said crankshaft one at each side of said master rod said rings being rotatable relative to said crankshaft and said master rod and overlapping the ends of said knuckle pins to restrain said pins against excessive longitudinal movement.

20. In combination with an engine crankshaft, master rod and link rods, knuckle pins for connecting said link rods to said master rod each having an intermediate bearing in the respective link rod and end bearings in said master rod and being longitudinally and rotationally movable in said bearings, a bearing sleeve surrounding said crankshaft within said master rod rotatable with respect to both said crankshaft and said master rod, a flat ring rotatably mounted on said crankshaft at each end of said bearing sleeve to constitute oil seals between said master rod and said crankshaft, said rings overlapping the ends of said knuckle pins to retain said pins in assembled relation in said master rod and the respective link rods.

GEORGE J. MEAD.
ANDREW V. D. WILLGOOS.